(12) United States Patent
Graves (10) Patent No.: US 7,437,329 B2
(45) Date of Patent: Oct. 14, 2008

(54) POINT-OF-SALE ACTIVATION OF MEDIA DEVICE ACCOUNT

(75) Inventor: Phillip Craig Graves, Atlanta, GA (US)

(73) Assignee: e2Interactive, Inc., Atlanta, GA (US)

( * ) Notice: Subject to any disclaimer, the term of this patent is extended or adjusted under 35 U.S.C. 154(b) by 0 days.

(21) Appl. No.: 11/930,559

(22) Filed: Oct. 31, 2007

(65) Prior Publication Data

US 2008/0046283 A1    Feb. 21, 2008

Related U.S. Application Data (63) Continuation of application No. 11/237,950, filed on Sep. 29, 2005.

(60) Provisional application No. 60/664,370, filed on Mar. 23, 2005.

(51) Int. Cl.
  *G06Q 40/00* (2006.01)
(52) U.S. Cl. .............................. 705/41; 705/35; 902/25; 235/380
(58) Field of Classification Search ................... 705/35, 705/41; 238/380
  See application file for complete search history.

(56) References Cited

U.S. PATENT DOCUMENTS

| | | | |
|---|---|---|---|
| 5,511,114 | A | 4/1996 | Stimson et al. |
| 6,575,361 | B1 | 6/2003 | Graves et al. |
| 6,612,487 | B2 | 9/2003 | Tidball et al. |
| 6,757,361 | B2 | 6/2004 | Blair et al. |
| 6,837,426 | B2 | 1/2005 | Tidball et al. |
| 6,868,403 | B1 * | 3/2005 | Wiser et al. .................... 705/51 |
| 6,918,537 | B2 | 7/2005 | Graves et al. |
| 7,003,499 | B2 | 2/2006 | Arditti et al. |
| 7,003,500 | B1 | 2/2006 | Driessen |
| 7,063,255 | B2 | 6/2006 | Algiene |
| 7,083,084 | B2 | 8/2006 | Graves et al. |
| 7,093,761 | B2 * | 8/2006 | Smith et al. ............ 235/462.07 |
| 7,168,615 | B2 | 1/2007 | Smith |
| 7,191,939 | B2 | 3/2007 | Beck et al. |
| 7,219,835 | B2 | 5/2007 | Graves et al. |
| 7,243,839 | B2 | 7/2007 | Beck et al. |
| 7,252,226 | B2 | 8/2007 | Risafi et al. |
| 7,281,653 | B2 | 10/2007 | Beck et al. |

(Continued)

OTHER PUBLICATIONS

Apple-Itunes-Store-Shop. As view at http://web.archive.org/web/20040401085851/www.aplle.com/itunes/stores/shop.html . p. 1-2.*

(Continued)

*Primary Examiner*—James P Trammell
*Assistant Examiner*—Jamie H Swartz
(74) *Attorney, Agent, or Firm*—Hunton & Williams LLP (57) ABSTRACT

The present invention discloses systems and methods for activating and redeeming prepaid media download cards and devices. Methods for activating prepaid media download cards may comprise storing at a central processor a media download card identifier identifying a specific prepaid media download card, inputting the prepaid media download card identifier at a merchant terminal during a purchase of the prepaid media download card, receiving at a central processor a prepaid media download card activation request, determining whether to authorize activation of the prepaid media download card based on the media download card identifier, and activating the prepaid media download card in response to a determination to authorize activation of the prepaid media download card.

8 Claims, 5 Drawing Sheets

U.S. PATENT DOCUMENTS

| | | | |
|---|---|---|---|
| 7,292,998 | B2 | 11/2007 | Graves et al. |
| 7,311,249 | B2 | 12/2007 | Smith et al. |
| 7,328,190 | B2 | 2/2008 | Smith et al. |
| 2001/0001856 | A1 | 5/2001 | Gould et al. |
| 2002/0002503 | A1 | 1/2002 | Matsouka |
| 2002/0095420 | A1 | 7/2002 | Hovsepiam |
| 2002/0198737 | A1 | 12/2002 | Valtanen |
| 2003/0004889 | A1* | 1/2003 | Fiala et al. .................... 705/64 |
| 2003/0092435 | A1 | 5/2003 | Boivin |
| 2003/0226030 | A1 | 12/2003 | Hurst et al. |
| 2004/0139318 | A1 | 7/2004 | Fiala et al. |
| 2004/0225605 | A1 | 11/2004 | Rowe |
| 2005/0021458 | A1 | 1/2005 | Rowe |
| 2005/0080678 | A1 | 4/2005 | Economy et al. |
| 2005/0107068 | A1 | 5/2005 | Smith et al. |
| 2005/0125300 | A1 | 6/2005 | McGill et al. |
| 2005/0130728 | A1 | 6/2005 | Nguyen et al. |
| 2005/0145691 | A1 | 7/2005 | Dillard |
| 2005/0154670 | A1 | 7/2005 | Heitz et al. |
| 2005/0169467 | A1 | 8/2005 | Risan et al. |
| 2006/0035631 | A1 | 2/2006 | White et al. |
| 2006/0104426 | A1 | 5/2006 | Cataldi |
| 2006/0206431 | A1 | 9/2006 | Scott et al. |
| 2006/0247042 | A1 | 11/2006 | Walker et al. |
| 2005/0199706 | A1 | 3/2007 | Beck et al. |
| 2007/0057045 | A1 | 3/2007 | Beck et al. |
| 2007/0198418 | A1* | 8/2007 | Macdonald et al. ........... 705/52 |

OTHER PUBLICATIONS

Tranzact Taps IDT Telecon for Sears Phone Cards, Oct. 16, 2004; Wireless News NA.

Woolworths Moves Into Mobile Entertainment, Aug. 26, 2004; New Media Age; 5(1).

Q Comm Enters Marketing Agreement with JCS Communications, Mar. 20, 2000; Cambridge Telecom Report, NA.

E-Commerce for Debtors, Sep. 22, 1999; Kenneth Li; Network World.

Your Life, Your Phone, Your Credit Card; Will Wireless be the Next Universal Payment System?, Jul. 28, 2005; V. 13; Issue 15; Wireless Business Forecast.

Opportunities Abound for Retailers in Portable Gaming, Jul. 23, 2004; Newsletter; Warren publ. Inc.

Echostar-RadioShack Deal Noosts Sirius Scunscriber Forecasts, Feb. 16, 2004; Satellite Week; Warren Publ. Inc.

Blackstone Online Chooses Hypercon Terminals for Prepaid Card Program, Jun. 14, 2000; V. 11; Issue 116; CableFAX.

Less Money, More DVD for Blckbuster, Aug. 23, 1999; Consumer Multimedia Report.

PC Game Rental Test to Expand, Aug. 9, 1999; Video Week.

Blockbuster Tests PC Game Rentals, May 17, 1999; Consumer Multimedia Report.

News in Brief (CITGO), May 3, 1999; V. 5; Issue 84; TR Daily.

Blockbuster Testing PC Game Pay-Per-Use Rentals, May 3, 1999; Video Week.

Blockbuster Novel in PC Game Rentals, May 3, 1999; Consumer Electronics.

Warner Bros. is Planning to Launch Interactive DVD Series, Apr. 26, 1999; Audio Week.

Defiant DIAX Claims holiday Success, Jan. 18, 1999; Consumer Multimedia Report.

Press Release Checklist (SmarTalk), Aug. 25, 1998; V. 2; Issue 165; Wireless Today.

Tranzact Taps IDT Telecom for Sears Phone Cards, Oct. 16, 2004; Wireless News NA.

Woolworth Moves Into Mobile Entertainment, Aug. 26, 2004; New Media Age; 5(1).

Q Comm Enters Marketing Agreement with JCS Communications, Mar. 20, 2000; Cambridge Telecom Report, NA.

E-Commerce for Debtors, Sep. 22, 1999; Kenneth Li; Network World.

Your Life, Your Phone, Your Credit Card: Will Wireless be the Next Universal Payment System?, Jul. 28, 2005; V. 13; Issue 15; Wireless Business Forecast.

Opportunies Aboound for Retailers in Portavle Gaming, Jul. 23, 2004; Newslettter; Warren publ. Inc.

SmarTalk Launches Point-of-Sale Activation for Prepaid Phone Cards Via American Express Card ARROVzation System, Aug. 24, 1998; Business Wire.

* cited by examiner

POINT-OF-SALE ACTIVATION OF MEDIA DEVICE ACCOUNT

CROSS REFERENCE TO RELATED APPLICATIONS

This application is a continuation of, and claims priority to, U.S. patent application Ser. No. 11/237,950, filed Sep. 29, 2005, which in turn claims priority to provisional U.S. Provisional Patent Application 60/664,370, filed Mar. 23, 2005, the disclosure of each is incorporated herein by reference in its entirety.

FIELD OF THE INVENTION

This invention relates to distributing and activating accounts and/or removable (or portable) media devices, such as flash drives, USB drives, external hard drives, thumb drives, memory cards of various formats (SD, CF, xD, Sony™ Memory Card Duo), SIM cards, other phone cards, or other devices containing a writable and/or readable memory. More particularly, the invention relates to activating an account related to a media device at a point-of-sale ("POS") and later activating the device by communicating with an account activation processor.

BACKGROUND OF THE INVENTION

Traditional media devices are distributed in a usable state to merchants and consumers. Such devices include a typical USB flash drive and camera memory stick before it is packaged and sent to merchants.

A primary benefit of many removable media devices is their diminutive size, as many of them are designed to be portable or to fit into a small compartment of an already small device such as a mobile phone or camera. However, the small size of such devices makes them relatively more vulnerable to theft. A thief who steals the USB flash drive from a merchant may use the USB flash drive to its full potential. The same is true for camera memory cards and other removable media. Because these devices are typically very expensive, there is a large potential for merchant loss.

Various methods have been employed to counteract theft. For instance, in the case of easily-stolen software products such as a Windows XP™ disc, the software may be distributed in a "locked" or "partially locked" condition. The software is not completely usable on a user's computer until the user accesses a central site. By accessing the central site, the user may obtain a password or a final piece of software code that will "unlock" the installed software. It should be noted that in this method, the media carrying the software is never locked. Thus, a plurality of different users could read the exact same ones and zeros encoded on the CD or DVD that carries the software. However, the central site ensures that only one user (or a limited number of users) may activate the software. In such prior art systems, it is the installed software on the user's computer—and not the software medium purchased by the user—that changes. Thus, for example, if a disc contains an operating system software that will expire 30 days after installation, a skilled user might theoretically re-install the software every thirty days and also pass the medium around to others who may achieve the same result.

SUMMARY OF THE INVENTION

The present invention discloses systems and methods for activating and redeeming prepaid media download cards and devices. Methods for activating prepaid media download cards may comprise storing at a central processor a media download card identifier identifying a specific prepaid media download card, inputting the prepaid media download card identifier at a merchant terminal during a purchase of the prepaid media download card, receiving at a central processor a prepaid media download card activation request, determining whether to authorize activation of the prepaid media download card based on the media download card identifier, and activating the prepaid media download card in response to a determination to authorize activation of the prepaid media download card.

These and other aspects will become apparent from the following description of the preferred embodiment taken in conjunction with the following drawings, although variations and modifications may be effected without departing from the spirit and scope of the novel concepts of the disclosure.

BRIEF DESCRIPTION OF THE DRAWINGS

The present invention can be more fully understood by reading the following detailed description together with the accompanying drawings, in which like reference indicators are used to designate like elements.

DETAILED DESCRIPTION OF EXEMPLARY EMBODIMENTS

Hereinafter, various embodiments of the invention will be described. As used herein, any term in the singular may be interpreted in the plural, and alternately, any term in the plural may be interpreted to be in the singular.

According to some embodiments, a media device account (or media device) may be activated, e.g., at a POS. Any system or method of activation may be used, such as those described for activating stored value card accounts and other devices in any of the following U.S. patents and patent applications: U.S. application Ser. No. 10/778,338 filed Feb. 17, 2004, U.S. application Ser. No. 10/253,243 filed Sep. 24, 2002, U.S. Provisional Application No. 60/324,333 filed Sep. 24, 2001, U.S. Provisional Application No. 60/396,404 filed Jul. 15, 2002, U.S. Provisional Application No. 60/519,630 filed on Nov. 14, 2003, U.S. Provisional Application No. 60/519,629 filed on Nov. 14, 2003, U.S. application Ser. No. 10/712,182 filed Nov. 13, 2003, U.S. application Ser. No. 10/655,828 filed Sep. 5, 2003, U.S. patent application Ser. No. 10/698,084 filed Nov. 3, 2003, U.S. application Ser. No. 10/411,971 filed Apr. 11, 2003, U.S. application Ser. No. 09/641,363 filed Aug. 18, 2000 (now issued as U.S. Pat. No. 6,575,361), U.S. Provisional Application No. 60/149,740 filed Aug. 19, 1999, U.S. application Ser. No. 10/732,641 filed Dec. 10, 2003, the U.S. application filed Dec. 19, 2003 under Ser. NO. 10/739,301, and the U.S. patent application filed Jan. 16, 2004 under Ser. No. 10/758,429. All of these applications are incorporated herein by reference in their entirety. Other features of these patents and applications are also contemplated herein. It should be appreciated that the authorization and activation of media devices as described herein may be combined with the novel systems and methods of the applications referenced above.

Figure 1:
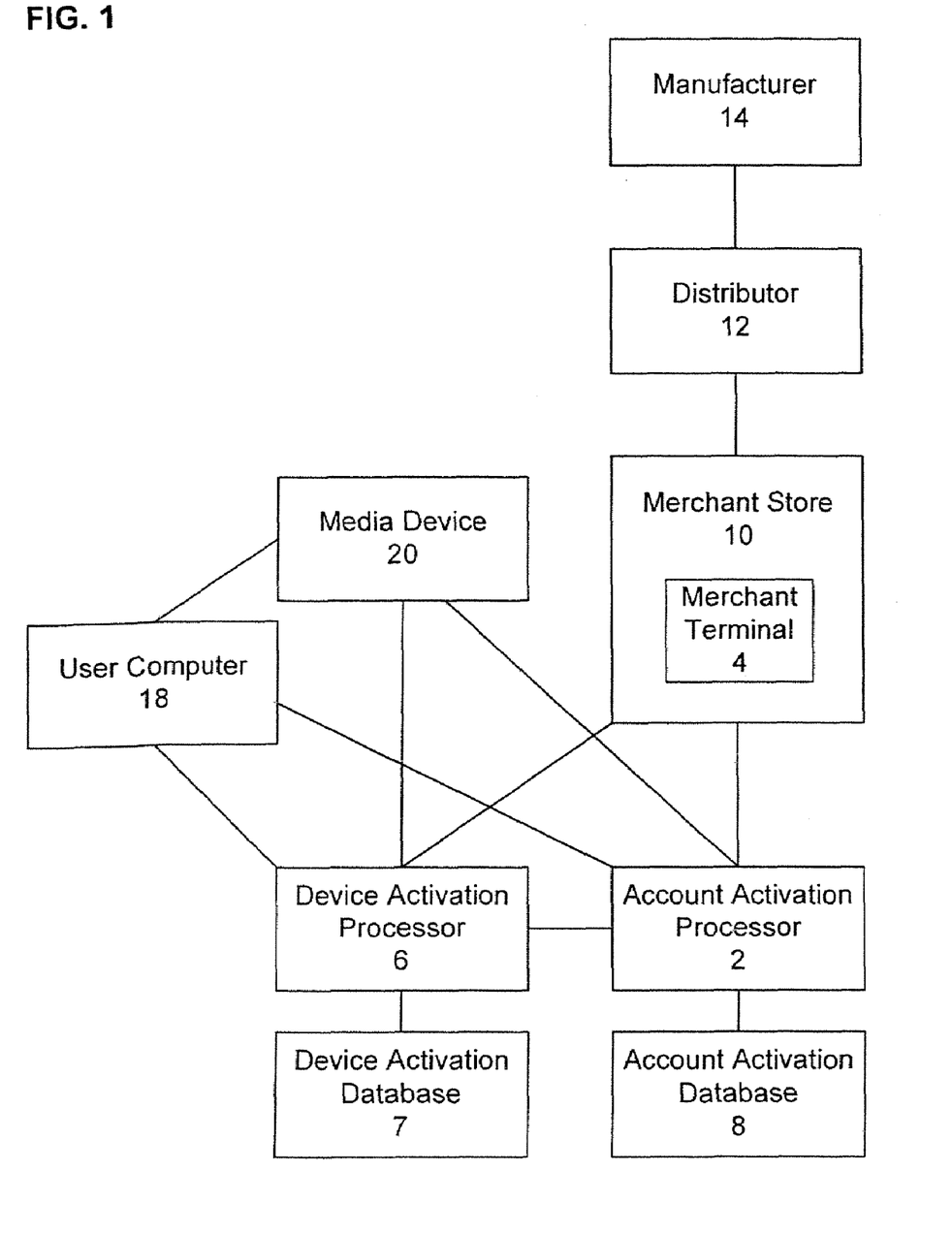
FIG. 1 illustrates a system for authorizing the activation of a media device according to an embodiment of the invention.

FIG. 1 illustrates a system for authorizing the activation of a media device according to an embodiment of the invention. The system comprises a manufacturer 14, distributor 12, one or more merchants 10, one or more merchant terminals 4, an account activation processor 2, a central database 8, a media activation processor 6 and a media activation database 7.

In some embodiments, a media device may be activated after an account associated with the device is activated. For instance, an account associated with a media device may be activated at a point-of-sale during a purchase transaction associated with the media device, such as a purchase of the device or a purchase of a feature of the device, such as a function or capability related to the device. The account may be activated in any known process of activating accounts, such as those known for stored value cards and referenced elsewhere herein. In one embodiment, information embodied in a barcode, UPC, or magnetic stripe associated with the device (or its packaging) is read at a point-of-sale device and transmitted to a central account activation processor. An account associated with the device may be activated, e.g., by creating or amending a database entry associated with the device. It should be appreciated that for purposes of this application, although the term "account" is used, there may be no actual account having value. The "account" may merely comprise a record that a device was validly sold or is otherwise authorized for activation (in whole or in part).

Once an "account" associated with the device has been activated, e.g., by verifying that the device was validly purchased or otherwise validly distributed, the media device may be activated or enabled. It should be appreciated that "activating a device" or "activating a feature" of a device is intended to mean activating some, all, or a portion of the functions, functionality, capabilities, or data stored in the device. A device is deemed to be "inactive" (or partially inactive) if it is not capable of performing all of its intended functions or utilizing all of its capabilities as a result of not being activated.

In some embodiments, the media device may comprise a data storage system such as a flash drive, USB drive, external hard drive, thumb drive, SD memory card, CF memory card, xD memory card, Memory Card Duo (or Pro Duo) memory card, floppy disc, CD, DVD, HD-DVD, Blu-Ray disc, or other data storage component or system. The data storage system may be formatted. For instance, the data storage system may comprise a formatted drive configured to store data loaded by a user. In some embodiments, the data storage system may be formatted in such a way that it cannot be used (in whole or in part), e.g., to store data, until its format is changed.

In some embodiments, the media device may comprise a processor, such as a wireless phone, PDA, pager, phone/PDA combination device, SIM card, internet-enabled device, portable gaming system, or any other media device. The device may be configured to perform a function, such as store data, access a website, surf the Internet, communicate on a telecommunications network, play media (such as music, videos, and games), or perform calculations. In some embodiments, the processor may be distributed in such a manner that one or more functions are disabled (in whole or in part). The functions may be enabled by communicating with a central processor, such as a media activation processor. For instance, the media activation processor may enable the device to install code that enables the functions.

In some embodiments, an attempt to use a media device that has not yet been activated may trigger automatic communication between a user processor on which the media device has been installed and the media activation processor, whereby the media activation processor may communicate instructions or code for activating the media device. In other embodiments, an attempt to use the media device may result in graphic presentation of a message to the user whereby the user is instructed to contact the media activation processor, such as by logging on to a website or calling a phone number to receive a code for input into the device. Establishing communication with the activation processor may allow the user to download instructions or code for activating the media device.

In some embodiments, an activation processor may distribute an activation code that may be input into the device to activate the device (or one or more of its functions). In other embodiments, an activation processor may communicate software code that may be loaded onto the device in order to activate it. In other embodiments, a central processor may communicate program code to a computer that can be installed on the computer. Running the program (e.g., when the computer is coupled to the device) may cause the device to be activated.

In some embodiments, an activation processor may communicate directly and/or indirectly with the media device. For instance, a SIM card may communicate directly with a central telecommunications provider that may install information onto the SIM card. A USB flash drive that is plugged into a USB port of a computer may communicate with a centralized website via the computer.

In some embodiments, the device may comprise a processor and a database storing encrypted data. One or more device functions may be disabled until the encrypted data is decrypted. Communication with a central processor may enable decryption.

In some embodiments, different functions may be activated at different times. For instance, a wireless communication function may be activated at one time, and an mp3 playing function may be activated at another time. Each activation may be enabled by a purchase associated with that function. For instance, a user may purchase a telecommunications service and then activate the service, and the user may later purchase the mp3 function and then activate the mp3 function.

In some embodiments, device activation may occur at the point-of-sale (POS). For instance, a point-of-sale terminal may be configured to interact with the media device. In some embodiments, the terminal may physically change the media device. For instance, the terminal may remove a physical tab on the media device that would otherwise prevent the media device from being usable (or otherwise physically alter the device to enable a feature of the device).

In some embodiments, the terminal may electronically interact with the media device (instead of or in addition to any interaction involving physical change). For instance, the terminal may be configured to change a processor and/or memory of the media device. For instance, the terminal may read and/or write to a memory of the media device. In some embodiments, the terminal may format a disk drive or memory of the media device. In some embodiments, the media device may install software onto the media device. Any form of activation is contemplated herein.

In other embodiments, device activation may occur after POS at a location remote from the POS, such as at a user's desktop computer.

In some embodiments, device activation may entail additional actions. For instance, a user may enter personal data, product registration data, or other information before the device is enabled.

In some embodiments, a media device storing information may be distributed to a user at a POS. At the POS, an identifier associated with the media device may be passed to a central processor. For instance, a magnetic stripe or barcode associated with the product may be read at a terminal during sale of the media device, and the identifier may be passed to a central processor. The central processor may authorize the activation of information stored on the device. The user may then transfer the information to another device, such as a user's computer. For instance, the user may install software stored on the media device onto the desktop computer. On the user's computer (or other device), the information may be fully or partially locked. For instance, the program may be usable for only a certain period of time, or certain features may be inaccessible to the user. Information (e.g., a program) may pass activation information to the user, such as a URL of a central processor that can be accessed to fully enable the information (e.g., the program). The user may access the central processor. The central processor may identify information about the media device (or identify the media device) and enable full functionality of the information based on such identification. For instance, the central processor may unlock a feature of an installed program by determining that the media device was validly sold at a POS (e.g., by determining that an identifier associated with the media device was received from a POS terminal during a valid transaction).

Figure 2:
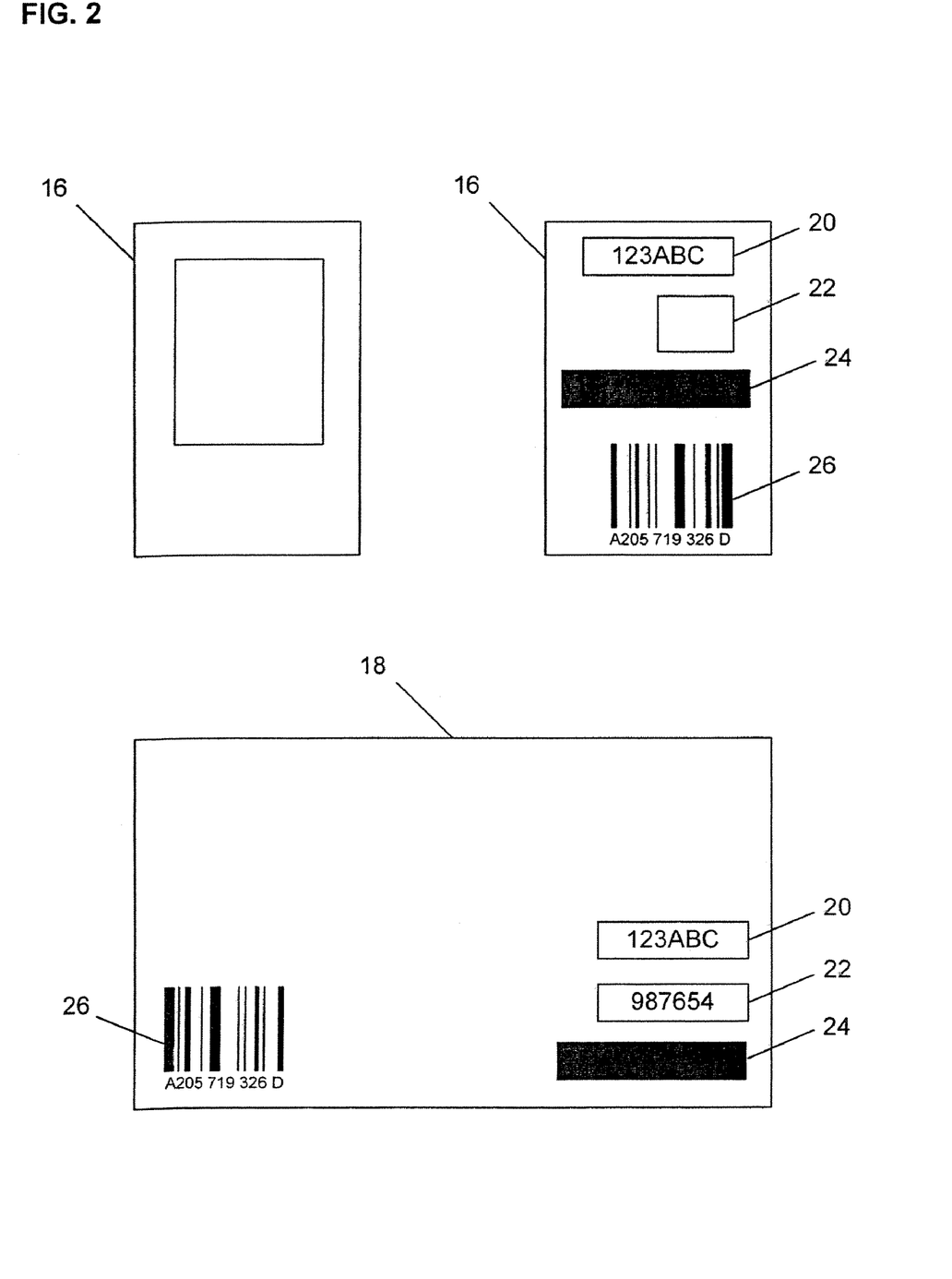
FIG. 2 illustrates an exemplary media device and package.

In some embodiments, the media device may be in a package, for instance when it is sold. The media device package may be any container, box, or packaging that may contain, hold, or otherwise couple to the device. In a preferred embodiment, the package contains the device 16 when the customer purchases the device at a merchant terminal 4.

In some embodiments, a manufacturer 14 may manufacture media devices and pass them to one or more distributors 12. The distributors 12 may ship the media devices to one or more merchant stores 10. The merchant stores 10 may comprise one or more merchant terminals 4. Customers may purchase the media devices at merchant terminals 4.

The merchant terminals 4 may comprise an input/output device for inputting media device and/or package information (such as an identifier) during a purchase transaction and passing such information to the account activation processor 2. For instance, the merchant terminals may comprise any point-of-sale terminal configured to process sale transactions between merchants and customers. The merchant terminal 4 may comprise a barcode scanner and/or a credit card reader, and it may be in selective communication with a network as well-known in the art.

The account activation processor 2 may comprise any data processing system that stores, manages, and/or processes device-related information. In one embodiment, the account activation processor 2 may itself be a media activation processor 6. The account activation processor 2 is configured to process device-related information (such as an identifier). The account activation processor 2 is further configured to store device-related information in a central database 8. The information may comprise information received from a merchant terminal 4 during a device sale transaction. The account activation processor 2 is also configured to communicate information to and from a media activation processor 6. For instance, the account activation processor 2 is configured to receive authorization requests and/or status inquiries from media activation processors 6. The account activation processor 2 is configured to process information stored in the central database 8 based on such requests and inquiries. The account activation processor 2 is also configured to pass information to the media activation processor.

In one embodiment, the account activation processor 2 is configured to communicate with merchant terminals regarding device activation requests.

The media activation processor 6 may process information it receives from the account activation processor 2. The media activation processor may also store information in a media activation database 7. The media activation processor 6 may also be configured to communicate with customers. For instance, the media activation processor 6 may be configured to receive device activation requests from customers. The media activation processor 6 is also configured to process information based on the request and/or communicate with the account activation processor based on the request. The media activation processor 6 may also be configured to pass information to the customer, such as an activation confirmation.

FIG. 2 illustrates an exemplary media device 16 and package 18, the activation of which may be authorized according to various embodiments of the invention. The top left figure in FIG. 2 shows the front view of a generic media device 16 such as a USB flash drive. The top left figure shows a rear view of the media device 16.

The device 16 may have an identifier 20 associated with the device 16. The identifier 20 may be applied to (e.g., labeled on) the device 16, the package 18, or both. The identifier 20 may comprise an electronic serial number (ESN), an IMEI, RFID, a subscriber information module (SIM), a UPC code, or other number or indicia that identifies the device 16. For instance, the ESN, IMEI, and/or SIM code may comprise numbers or codes that are uniquely associated with the device 16. The identifier may be applied in a SIM card 22 (or SIM card indicia 22), a magnetic strip 24, and/or a barcode 26. For instance, the barcode 26 may represent the ESN, IMEI, or SIM, and optionally the UPC. In one embodiment, the media device has a SIM card 22 or an equivalent of a SIM card.

The identifier 20 may be visible on the outside of the device 16 and/or package 18, or it may be applied or otherwise encoded on the device 16 and/or package 18. It also may be visible only after manipulating the device 16, such as by taking out a battery. The identifier 20 may be used by the merchant, distributor, media activation processor, and/or customer to track the location and activation status of the device 16, or for any other record-keeping purpose such as inventory management.

The device 16 is typically in a package 18 prior to and during sale to a customer. The package may have barcodes and other indicia on it. The package may comprise an identifier such as an ESN 20 in machine-readable indicia (such as a barcode). This identifier such as ESN 20 may also be printed (or magnetically encoded) on the media device itself. There may be more than one identifier 20 associated with the device 16 and/or package 18. The package 18 and device 16 may also have other barcodes (or other machine-readable indicia) used during purchase or during inventory scanning or other product scanning purposes. The package 18 may have one or more identifiers that are identical to or different from the one or more identifiers 20 associated with the device. In a preferred embodiment, the device 16 and package 18 have at least one identifier 20 in common.

The bottom figure of FIG. 2 shows a package 18 configured to contain the media device 16. The package 18 may have one or more identifiers printed or otherwise stored on the package 18 as described for the media device. The package identifiers may be the same or different from the media device identifiers. In a particular embodiment, the package 18 and device 16 have at least one identifier that is identical on both the package 18 and device 16, such as an ESN 20.

Figure 3:
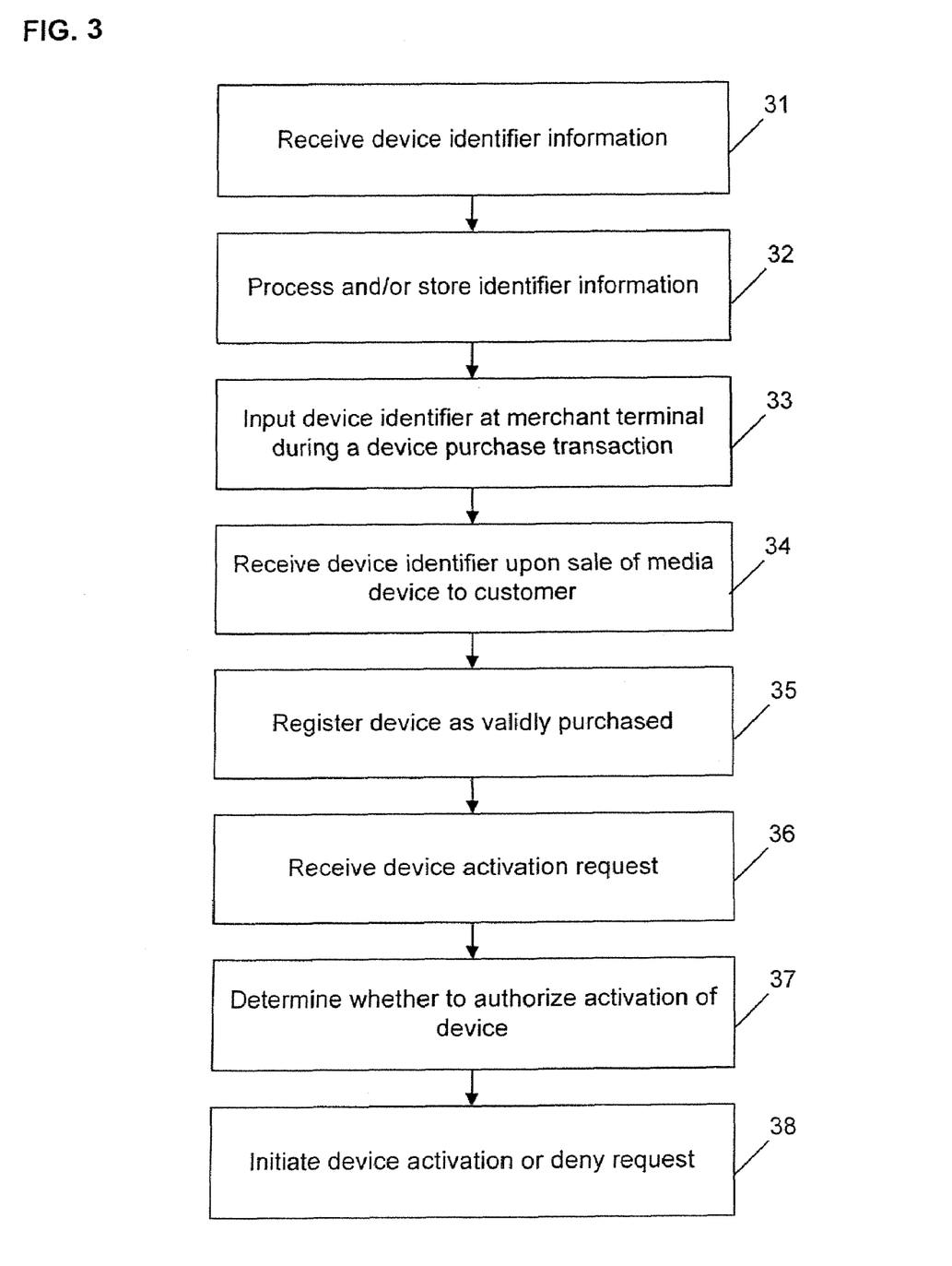
FIG. 3 illustrates a flowchart showing a method of distributing a media device according to an embodiment of the invention.

FIG. 3 illustrates a flowchart showing a method of authorizing the activation of a media device according to an embodiment of the invention. As used herein, the term "media device" refers generally to any type of storage or data processing device.

In block 31, media device identifier information may be received. For instance, the account activation processor and/or media activation processor receives media device identifier information. The manufacturer (or distributor) of the media devices may pass an inventory list of media device ESNs (or other identifiers) to the account activation processor or media activation processor. Alternately, a merchant may provide a list of media device identifiers to the account activation processor or media activation processor after (or before) it receives the media devices from a distributor. The account activation processor will then have one or more media device identifiers that may eventually be purchased (or otherwise acquired) from merchants.

In a preferred embodiment, each media device is pre-associated with a media activation processor. Thus, if the media activation processor receives media device identifier information, it would only receive media device identifier information for the media devices pre-associated with it. In another embodiment, a media activation processor is chosen after purchase by the customer. In this embodiment, the media activation processor may not receive identifier information at this stage.

In optional block 32, the identifier information may be stored and/or processed. For instance, the account activation processor and/or media activation processor stores identifier information. The account activation processor and/or media activation processor may store a list of ESNs corresponding to media devices that were received by a particular store, delivered by a particular distributor, or manufactured by a particular manufacturer. The information may be stored in a central database coupled to the account activation processor or a media activation database coupled to the media activation processor. The account activation processor (and/or media activation processor) may also store status information associated with each media device. Because the media devices have not yet been sold (according to some embodiments), the account activation processor (and/or media activation processor) may store information for each media device indicating that the media device is "not sold" and/or is "not activated." Other methods of storing and/or identifying stored information may be used.

In block 33, a media device identifier may be input at a merchant terminal during a media device purchase transaction. For instance, one or more media device identifiers may be input at a merchant terminal during a transaction in which a customer purchases the media device. In this block, the customer selects a media device to purchase and purchases the media device at a merchant terminal. During the sale, the media device package (or media device) may be scanned at the merchant terminal. In a preferred embodiment, an ESN associated with the media device is input at the terminal by scanning the media device package. Whether the package or media device is scanned or otherwise entered, the identifier input at the merchant terminal is uniquely associated with the media device itself.

Multiple identifiers may be input at the merchant terminal. For instance, a UPC code may be input as well as an ESN, IMEI, SIM, or other identifier. The UPC may input for merchant inventory purposes, while the ESN may be input for purposes of eventual media device activation.

It should be noted that the media device may be inactive or disabled prior to delivery to the customer. For instance, some media devices may be hotlined or otherwise disabled at an internal switch. It may be actively or passively disabled. In some embodiments, the merchant may disable the media device at (or prior to) purchase. In a preferred embodiment the media device may be disabled before it is distributed to the merchant. In one embodiment, the media activation processor disables the media device, such as before the merchant receives the media device into merchant inventory. Disabling of the media device may occur before it is offered to the customer (e.g., before the product is placed on the store shelves or otherwise offered to the customer), or it may occur during the purchase transaction. In some embodiments, in order to activate the media device, the customer must later contact a central server such as by calling an 800 number or accessing a website of the media activation processor. The server may comprise a computer or media device system of a media activation processor and may be adapted for enabling the customer's purchased media device.

In optional block 33, the merchant terminal may also input information regarding the purchaser, such as the purchasers name, address, social security number, PIN, home or other telephone number, email address, website, or other information. Some of this information may be identified via a purchaser credit card or check, or the information may be provided by the customer at the request of the merchant. Customer information may also be passed to the account activation processor or media activation processor, which may store such information in a database. This information may be used to verify the identity of the purchaser when the purchaser later activates the media device.

In block 34, the account activation processor may receive a media device identifier. An account (or record) associated with the media device (or a function or capability thereof) may be activated based on receiving the identifier. Activation may occur by any means or mechanisms described or referenced herein, or by any other means known in the art. It will be understood that activation of the account does not mean that the media device has been activated/enabled.

The identifier may be the identifier input in block 33. For instance, the merchant terminal may input the identifier and then pass the identifier to the account activation processor during sale of the media device to a customer. In a preferred embodiment, this occurs simultaneously with the sale. For instance, the sale transaction may comprise inputting the identifier information and automatically passing the information to the account activation processor. For instance, a barcode may be scanned during purchase, as with typical transactions, and the barcode number may be passed to the account activation processor.

If a customer's funds are later determined to be invalid or insufficient, or if there is any other problem with the transaction (e.g., if the media device is returned), the merchant or merchant terminal may notify the account activation processor of the problem at that time. The media device account may then be deactivated. Appropriate records of such return transactions may be stored and passed to the media activation processor and account activation processor.

Alternately, there may be a delay between inputting the information at the merchant terminal and passing identifier information to the account activation processor. For instance, the merchant terminal may wait until the customer's purchase funds clear to ensure that only validly purchased media device identifiers are passed to the account activation processor.

Also, if a media device is stolen or damaged, or is otherwise not eligible for distribution to a customer, the account activation processor may amend a database entry corresponding to the media device to reflect that the media device has been "cancelled." Such a media device may not be activated, as reflected by its "cancelled" status.

In block 35, the media device may be registered as being validly purchased and/or ready for activation. In a preferred embodiment, the account activation processor passes media device identifier information to a media activation processor system to indicate that the media device was validly purchased. It may pass such information via any media device or means, such as via the internet, dedicated data line, telephone IVR, or other system.

In a preferred embodiment, the account activation processor transfers such information via an API so that the media activation processor system can easily recognize and process the information. After the media activation processor system processes the information, the media device may be registered in the media activation processor's system as a validly purchased media device. For instance, the media activation processor may store the identifier in a media activation database file that includes identifiers for media devices that have been validly purchased. The fact that the media device is valid (or invalid) may be apparent from the file in which it is stored. Or, the media activation processor may amend an existing database entry corresponding to the media device to indicate that the media device has been validly sold.

Alternately, the account activation processor may store status information indicating that the media device is "sold and ready for activation." It may store such information in the manner described for the media activation processor system, or in any manner known in the art.

In block 36, the media activation processor may receive from a customer a request to activate the media device. In some embodiments, the media device may communicate with the activation processor, directly or indirectly via a user computer, such as a desktop or laptop computer. In some embodiments, a customer may contact the media activation processor (via phone, internet, etc.) to activate the media device. For instance, the customer may call an 800 number that accesses a media activation processor IVR system, or the customer may access the media activation processor's website. As discussed above, some embodiments may provide for automatic initiation of contact with the media activation processor upon an attempt to use an non-activated media device. This communication may be made by the media device itself or may be established through a processor in which the media device has been installed.

The customer may also call a media activation processor customer service or activation department. The customer may provide identifier information to the media activation processor system so that the media activation processor system can identify the specific media device for activation. For instance, the customer may provide the ESN or SIM, such as by entering the ESN at an internet or IVR prompt. Alternately, if the customer contacts the media activation processor using the media device itself, the media device may automatically provide identifier information to the media activation processor system. The activation processor may also determine this information by receiving information directly or indirectly from the media device, or by performing queries (directly or indirectly) on information stored in the media device.

The customer may also provide customer identification information. Such identification information may comprise a customer name, address, phone number, receipt number, product number, or other number or code that may be associated with the purchased media device, purchaser, vendor, or wireless service provider. The media activation processor may request to verify such information prior to activation.

In block 37, the media activation processor may determine whether the media device has been validly purchased. In a preferred embodiment, the media activation processor may check its database to determine whether the identifier is associated with a validly purchased media device. For instance, the media activation processor may determine whether an identifier associated with the media device (such as the ESN) is stored in a database corresponding to valid media devices.

In another embodiment, the media activation processor system may contact the account activation processor to determine whether the identified media device has been validly sold. For instance, the media activation processor system (such as a customer service center) may pass a media device identifier (such as the one provided in block 36) to the account activation processor. This may occur by accessing an account activation processor IVR system, or by any other method of communication as described herein. The account activation processor would receive the identifier, access its database to determine whether the identifier is associated with a validly purchased identifier, and then pass an authorization result back to the media activation processor. The authorization result may indicate that the media device was validly sold or that the media device was not validly sold (or that there was some other problem associated with the media device). For instance, the account activation processor may determine the authorization result based on stored authorization status information.

In block 38, the media activation processor may initiate activation of the media device or deny the customer's request. If the media activation processor determines that the media device was validly purchased, the media activation processor may initiate activation of the media device. If the media activation processor determines that the media device was not validly purchased, or if there is some other problem with the purchase of the media device, then the media activation processor may deny the customer's request and refuse to activate the media device. In some embodiments, activation may be accomplished through communication between the media activation processor and the media device. This may be direct communication to the media device or may be communication through a processor on which the media device has been installed. Activation may be accomplished based on instructions or code received from the activation processor by the media device or a processor on which the media device has been installed.

Once activated, the media device (or one or more features of the device) may become usable. For instance, if the media device is a USB flash drive, then activation might allow the customer to store information on the flash drive and/or retrieve information pre-installed on the flash drive.

It should be appreciated that activation authorization may be based on any of a variety of factors. For instance, a device may be activated a certain number of times, or an authorization code received from customers may be usable a certain number of times. There may also be limits associated with the number or degree of usable functions on a particular device. For instance, a larger amount of storage space may be enabled based on how money was spent on the device, or how much money was added to an account associated with the device. Activation of all or part of the functions of a device may also be based on any of the following: the number of times a specific program or type of software has been loaded onto a device; the number of times the device (or a function of the device) has been used; the length of time a device has been used; the time elapsed since purchase of the device; the amount of funds in an account associated with the device; the activity of an account associated with the device; the status of a user account (e.g., having an account in good standing); the status of a user, e.g., with the activation processor or other entity (or marital, employment, or other status); personal information of the user; and other factors.

Figure 4:
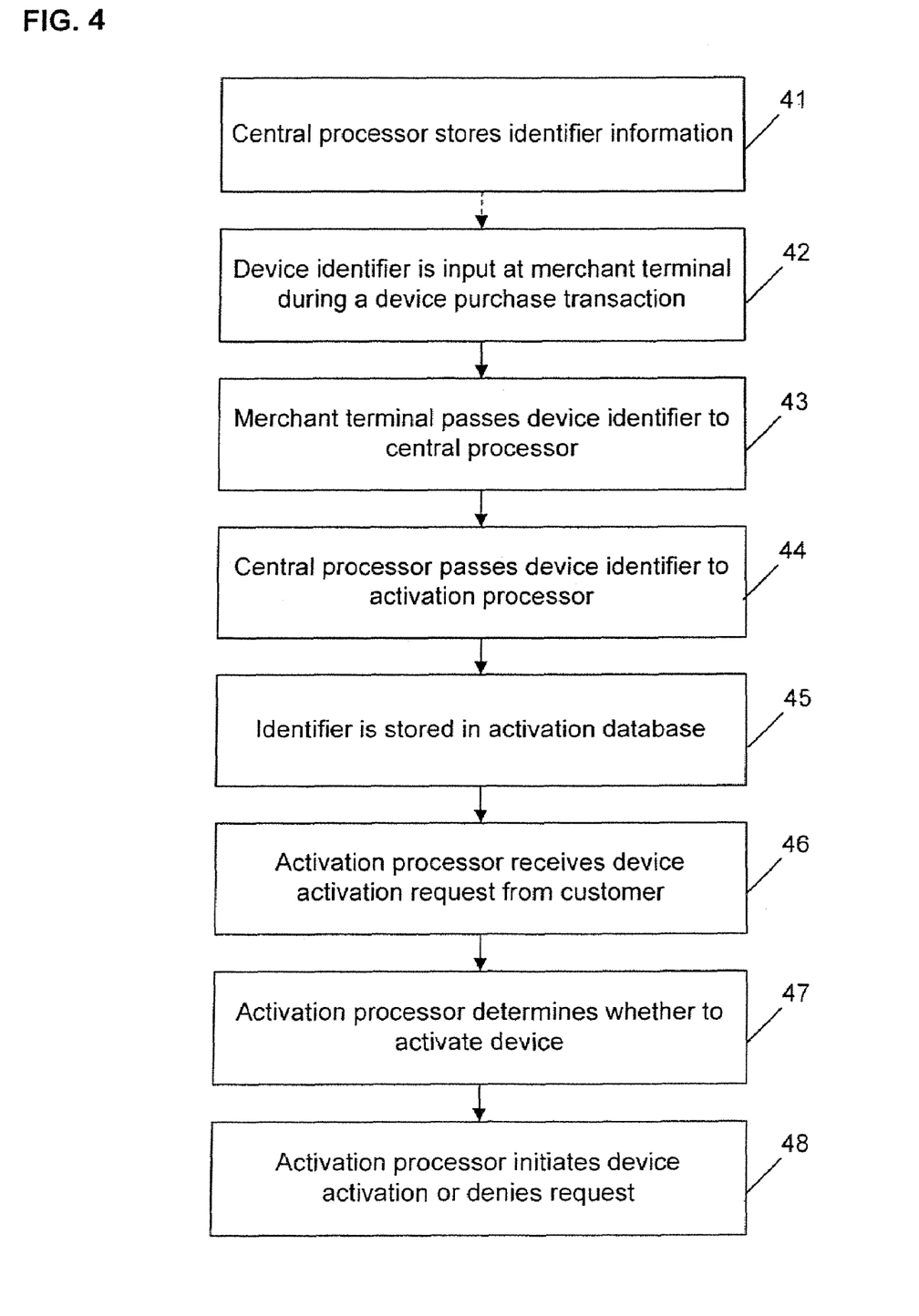
FIG. 4 illustrates a flowchart showing a method of authorizing the activation of a media device according to another embodiment of the invention.

FIG. 4 illustrates a flowchart showing a method of authorizing the activation of a media device according to another embodiment of the invention. The method of FIG. 4 should be interpreted in light of the discussion of FIG. 3.

In optional block 41, the account activation processor may store identifier information, e.g., as described for block 32.

In block 42, a media device identifier may be input at a merchant terminal during a media device purchase transaction, e.g., as described for block 33.

In block 43, the merchant terminal may pass the identifier to the account activation processor, e.g., as described for 34.

In block 44, the account activation processor may pass the identifier to the media activation processor.

In block 45, the identifier may be stored in a media activation database. A status of the identifier (and/or corresponding media device) may be stored and/or updated based on receiving the identifier from the account activation processor. Some of the various status possibilities are described below with respect to FIG. 5. It should be understood that other activity status categories are also contemplated herein.

The actions described at blocks 44 and 45 may occur when, e.g., the account activation processor inserts the identifier into a media activation database, e.g., using an API. An example of this process is also described in block 35.

In block 46, the media activation processor may receive a media device activation request, e.g., as described for block 36.

In block 47, the media activation processor may determine whether to authorize activation of the media device. This action may comprise accessing a media activation database to determine whether the identifier is in the database, or to determine whether the identifier is associated with a media device that has been approved for activation. This may also comprise determining the status of the identifier (and/or the corresponding media device).

In block 48, the media activation processor may respond to the customer request by either initiating activation of the media device or by denying the customer request. For instance, if the identifier is in the database (or if the identifier is associated with a media device approved for activation), the media activation processor will initiate activation of the media device. If not, then the media activation processor may deny the request.

Figure 5:
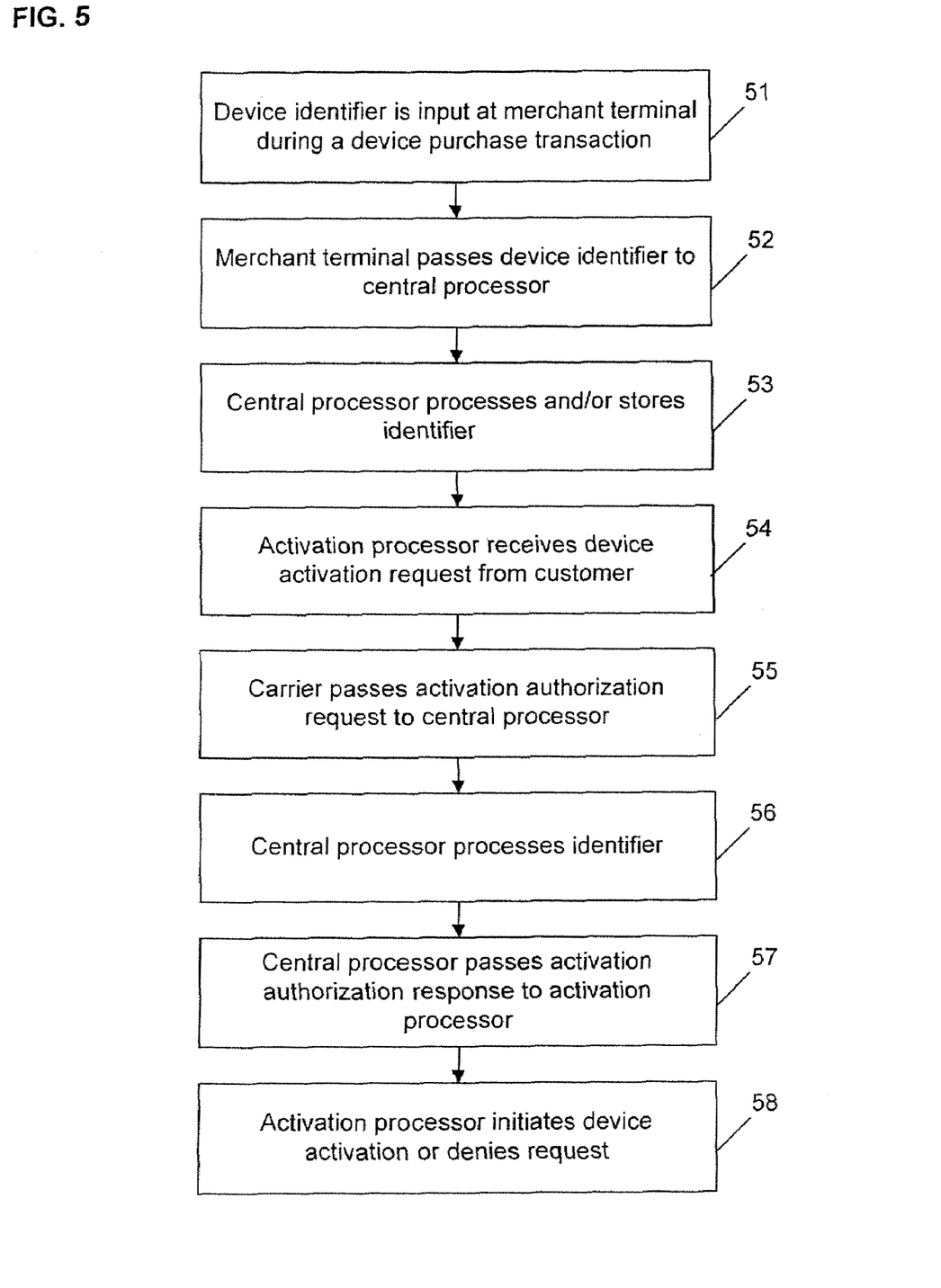
FIG. 5 illustrates a flowchart showing a method of authorizing the activation of a media device according to yet another embodiment of the invention.

FIG. 5 illustrates a flowchart showing a method of authorizing the activation of a media device according to yet another embodiment of the invention. The method of FIG. 5 should be interpreted in light of the discussion of FIG. 3.

In block 51, the media device identifier may be input at a merchant terminal during a media device purchase transaction, e.g., as described for block 33.

In block 52, the merchant terminal may pass media device identifier information to the account activation processor, e.g., as described for block 43.

In block 53, the account activation processor may process and/or store the identifier. For instance, the account activation processor may store the identifier in a database entry (or amend an existing database entry) to indicate that the identifier was received from a merchant terminal. The entry may be reflect that the corresponding media device has a particular status, e.g., that the media device is sold and ready for activation.

In block 54, the media activation processor may receive a media device activation request from the customer, e.g., as described for block 46.

In block 55, the media activation processor may pass the activation authorization request to the account activation processor.

In block 56, the account activation processor may process the identifier. The account activation processor may determine whether the identifier was validly sold. For instance, the account activation processor may determine whether the identifier was received in a transaction according to blocks 51 and 52. The account activation processor may also determine the status of the media device (and/or corresponding identifier). For instance, the account activation processor may determine that the media device has a particular status, such as "sold and ready for activation," "not sold," "sold and activated," "sold and returned," or "cancelled" (or other status category). Depending on the status, the account activation processor may determine to pass a positive or negative (or other) activation response. For instance, the account activation processor may determine to send a positive response if the corresponding media device is "sold and ready for activation." The account activation processor may pass a negative response if the status is "cancelled," "not sold," or "sold and returned."

In block 57, the account activation processor may pass an activation authorization response to the media activation processor. The authorization response may be an indication to activate or to not activate. The authorization response may comprise status information about the identifier and/or corresponding media device.

In block 58, the media activation processor may either initiate activation of the media device or deny the customer's request, e.g., as described for block 48. The media activation processor's action may be based on the account activation processor's response in block 57.

It should be noted that in various embodiments, different identifiers may be used in the different blocks described herein, provided that the different identifiers are associated with a single media device. I.e., it is not necessary that the ESN be the single identifier that is used throughout the process. For instance, a barcoded number (e.g., a number that is mapped to or otherwise associated with a media device identifier in a database) may be scanned at the merchant terminal and passed to the account activation processor, but the processor may determine the media device identifier and pass it to the media activation processor. Here, the account activation processor may receive the UPC and determine the media device identifier that is associated with that barcode by processing information stored in a database (for instance, information received from the merchant associating UPC numbers with media device numbers). Also, it should be appreciated that the term "identifier" may comprise information associated with the identifier. In other words, an identifier received by a media activation processor need not be the exact same as the identifier passed from a merchant terminal to an account activation processor in an earlier block, provided that the two identifiers are uniquely associated with the same device.

It should also be noted that the media devices mentioned above may be activated in any manner as described for activating PINs in the above-referenced applications.

In another embodiment, a post tender (or post sale) verification may be performed to reduce theft. One problem may be that the media device may be activated during the sale procedure, but then the sale procedure may be interrupted for many reasons such as lack of funds by the intended customer. In this case, the media device may be activated (but not paid for), thus creating a risk of theft of an activated (and valuable) media device.

Various embodiments of the invention present at least two potential approaches to address the problem of media device activation followed by sale interruption. First, the system may include a presumption that no sales transactions are completed until verification (e.g., verification of payment) is received. Thus, a verification transmission may be required to verify that the sale was completed. For instance, an account (or device or device feature) may remain inactive, even after a customer has purchased a device in a purchase transaction, until the a transaction verification is determined and/or received. Such transaction verification may be a verification that funds of a customer's payment have actually been confirmed and/or transferred into a merchant account. If this verification transmission was not received in a timely fashion, then in some embodiments the device would not be activated; and in some embodiments, the device would be de-activated.

In some embodiments, the system may operate under the assumption that sales transactions will be properly completed. For instance, the system may automatically activate a device (or function) during (or at least based on) a transaction, before customer funds have cleared. In such cases, the media device may be activated during the sales transaction and may remain activated, e.g., unless a message stating that the transaction has been cancelled (or similar code or instruction) is sent (e.g., by a merchant terminal) and received (e.g., at a central activation processor such as device activation processor 6 and/or account activation processor 2).

A sales transaction may include purchasing a media device, or renting a media device, or temporarily activating a feature (function, functionality, capability, or stored data) of a media device, or permanently activating a feature of a media device.

A post tender (or post sale) verification may be performed integrally with other embodiments, such as the embodiments illustrated by FIGS. 1-5.

Various embodiments of the invention may be used to activate a prepaid card. Many wireless telephone users and other recipients of goods and/or services utilize prepaid account arrangements that require payment before services will be provided. The various embodiments of the invention relate to any good or service and any provider of a good and/or service. Examples of prepaid services that may be accommodated by a stored-value card include long distance telephone communication, wireless communication, paging and internet-enabled communication services, including wireless web access, emergency road service, legal service, accounting service, tax service, property cleaning and/or maintenance service, clothe cleaning service, transportation service, travel service, delivery service, online (or off-line) dating service, electrical and/or gas service, water service, sewage service, internet access, and film processing (including digital film processing). Other examples of prepaid services and/or products that may be accommodated by a stored-value card include gift cards, prepaid gas cards, prepaid grocery cards, prepaid entertainment cards, prepaid movie cards, downloadable ring tone cards, downloadable game cards, downloadable movie cards, downloadable music cards that use MP3, MP4, WMV, WAV, or other music formats, any other downloadable software card, customer rewards cards, bridge and/or road toll cards, and any other type of stored-value cards for products, services, or both, that may be prepaid by the owner of the card.

It will be understood that the specific embodiments of the invention shown and described herein are exemplary only. Numerous variations, changes, substitutions and equivalents will now occur to those skilled in the art without departing from the spirit and scope of the present invention. Accordingly, it is intended that all subject matter described herein and shown in the accompanying drawings be regarded as illustrative only and not in a limiting sense and that the scope of the invention be solely determined by the appended claims.

What is claimed is:

1. A method of activating and using a prepaid media download card, wherein the process of activating and using the prepaid media download card is facilitated by a central processor, a merchant terminal and a provider of goods or services, the central processor being in selective communication with the provider of goods or services and the merchant terminal, comprising:

(a) storing in a database at a central processor a media download card identifier identifying a specific prepaid media download card;

(b) inputting the prepaid media download card identifier at a merchant terminal during a purchase of the prepaid media download card;

(c) receiving at the central processor a prepaid media download card activation request, the request comprising the prepaid media download card identifier;

(d) determining whether to authorize activation of the prepaid media download card based on the media download card identifier;

(e) preventing activation of the prepaid media download card until the central processor receives a confirmation indicating the completion of the purchase transaction;

(f) activating the prepaid media download card in response to a determination to authorize activation of the prepaid media download card and receipt of the confirmation indicating the completion of the purchase transaction;

(g) receiving at the central processor a redemption request, wherein the redemption request comprises the media download card identifier and a selection of one or more media downloads;

(h) determining at the central processor whether the media download card identifier received is valid, unredeemed, and authorized for redemption of the one or more media downloads;

(i) upon a determination that the media download card identifier is valid, unredeemed, and authorized for redemption of the one or more media downloads, authorizing the one or more media downloads;

(j) making the one or more media download material available for download.

2. The method of claim 1, wherein the activation request is received from the merchant terminal.

3. The method of claim 1, wherein the activation request is received from a user computer.

4. The method of claim 1, wherein the prepaid media download card comprises an indicia redeemable for movies, television programs, games, music that uses MP3, MP4, WMV, WAV or any other music format, and any other entertainment related product or service.

5. The method of claim 1, wherein the prepaid media download card is an internet-enabled or downloadable media card.

6. The method of claim 1, wherein activating the media download card comprises passing activation information to a user, the activation information being usable by the user to activate the prepaid media download card.

7. The method of claim 1, wherein the confirmation comprises a confirmation that purchase funds have been transferred from a buyer of the media download card to a seller of the media download card.

8. The method of claim 1, wherein the prepaid media download card is activated on the internet or a communications network by a user.

* * * * *